Patented Sept. 25, 1934

1,974,536

UNITED STATES PATENT OFFICE 1,974,536

BRAKE

Bryan E. House, South Bend, Ind., assignor to Bendix Brake Company, South Bend, Ind., a corporation of Illinois Application September 25, 1930, Serial No. 484,327

2 Claims. (Cl. 188—106)

This invention relates to operating mechanism for brakes and the like, and is illustrated as embodied in a novel arrangement of shaft and levers for operating a set of four-wheel brakes. An object of the invention is to provide an inexpensive arrangement which can readily be adjusted to take up slack and which is so designed that possible failure of one of the shaft bearings will not impair the operation of the brakes.

The above and other objects and features of the invention, including various novel and desirable structural arrangements, will be apparent from the following description of the illustrative embodiment shown in the accompanying drawings, in which.

Figures 1, 3:
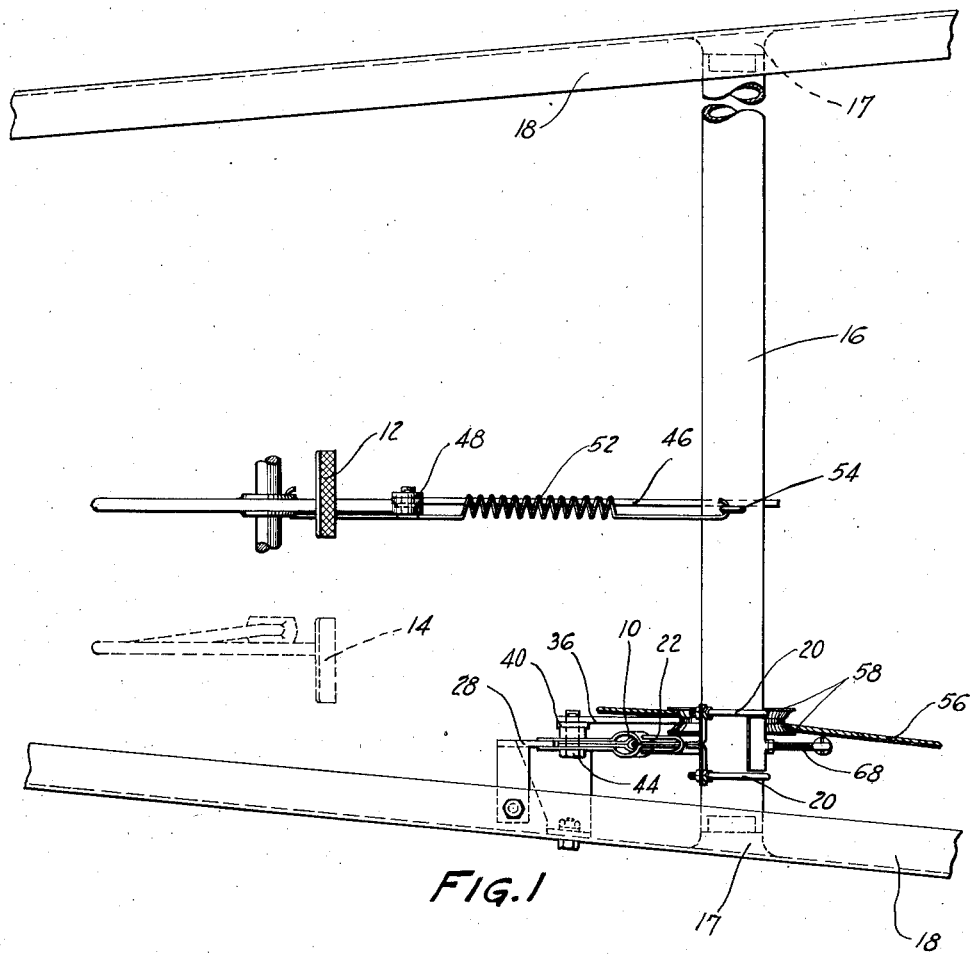
Figure 1 is a partial top plan view of part of an automobile chassis, showing the brake-operating shaft and levers.
Figure 3 is a section through one of the cable-engaging parts, on the line 3—3 of Figure 2.

The operating mechanism illustrated includes a pair of alternatively-operable brake levers, such as the hand-operated emergency lever 10 and the usual foot service pedal 12 arranged beside the clutch pedal 14 (shown in dotted lines), together with a transverse shaft 16 on which lever 10 is mounted and which is preferably hollow and which is supported at its ends by internal bearings carried by brackets 17 secured to the side members 18 of the chassis frame. Lever 10 is shown with a semi-cylindrical portion 19 engaging shaft 16 and secured thereto by the clamping action of a pair of U-bolts 20. Lever 10 has a bellcrank 22 connected by a rod 24 to a pawl 26 engageable with a ratchet 28 secured to the side frame member 18, a spring 30 serving to urge the pawl against the ratchet.

Immediately below shaft 16, and supported at its ends by any suitable bearings carried by the frame 18, is a hollow brake-operating cross shaft 32 having welded or otherwise secured thereto near each end a cross-head or lever 34 having, in the case of the lefthand cross-head, a horizontally-extending lever 36 carrying a pin riding in a lost-motion slot 38 in a vertically-extending connection 40 connected to a horizontal lever 42 forming part of the emergency lever 10 by means such as a pin 44 which may also serve as the fulcrum for pawl 26.

The shaft 32 also has welded or otherwise secured thereto a second and longer horizontally-extending lever 46 having a vertically-extending connection 48 with a lost-motion slot 50 extending upwardly to a horizontal portion 51 of the pedal lever 12. The return spring 52 for the pedal is shown connected to a cotter pin 54 in shaft 16.

Figure 2:
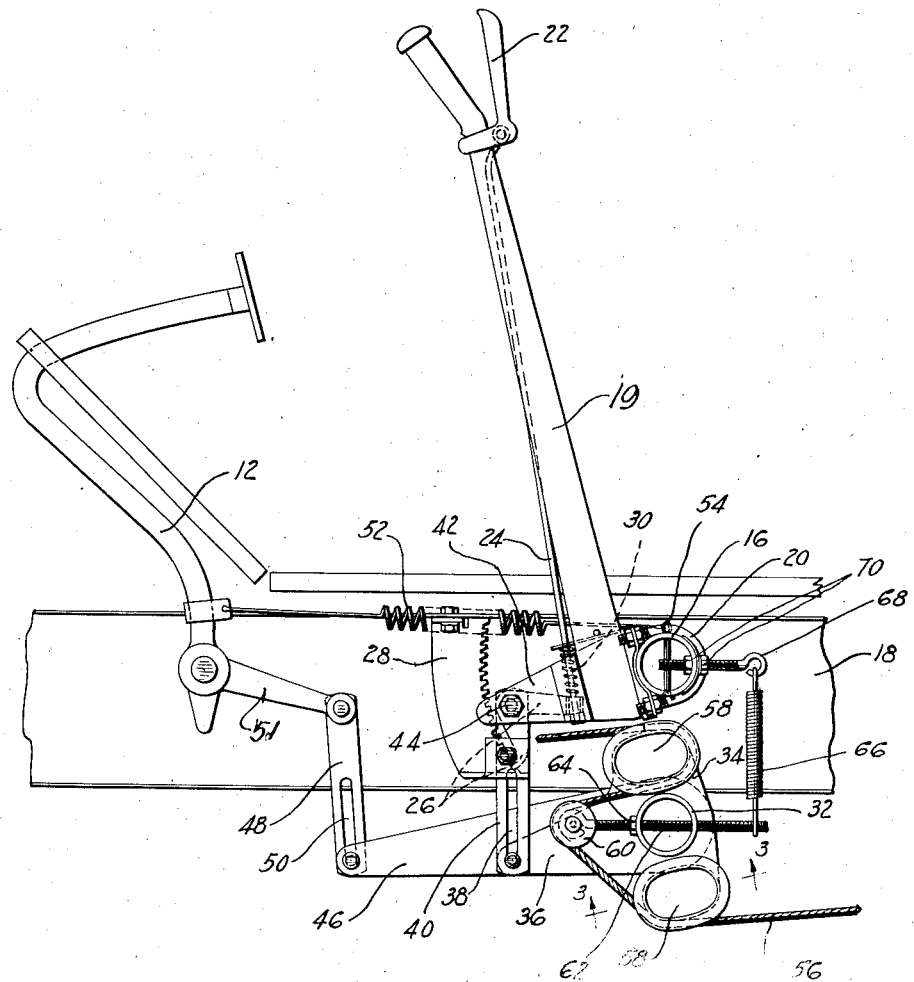
Figure 2 is a view looking upwardly in Figure 1, with the nearest side member of the chassis frame removed.

Each crosshead 34 is formed with devices similar to sheaves for a brake-operating cable 56, by securing cup-shaped stampings 58 to its opposite sides as shown in Figure 3. There is one such device above shaft 32 and one below the shaft, on each cross-head, and the cable is passed over them as shown in Figure 2.

Between the sheaves is preferably arranged a device which can be adjusted to take up slack in the cable, and shown as including a pulley 60 engaging the cable and carried by a threaded stem 62 extending through shaft 32 and having thereon a stop nut 64 engaging the shaft and adjustable to take up the slack in the cable. A return spring 66 for the shaft may be connected to one stem 62 and to an eye-bolt 68 carried by shaft 16 and clamped thereto by internal and external nuts 70.

Spring 66 also serves to hold shaft 32 against the bottom of frame members 18 in case of possible failure of the shaft bearings. The tension of connections 40 and 48 is also in this direction, thus giving an additional safety factor. It is even feasible if desired to use floating bearings for the shaft, as the operation of the brakes by either connection has no tendency to shift the shaft.

While one illustrative embodiment has been described in detail, it is not my intention to limit the scope of the invention to that particular embodiment, or otherwise than by the terms of the appended claims.

I claim:

1. A shaft having a pair of horizontally-extending arms, and a pair of alternatively-operable levers having horizontally-extending arms terminating respectively above the corresponding ones of the first arms, and a vertically-extending lost-motion connection between each of the first arms and the corresponding one of the second arms.

2. Operating mechanism for brakes comprising a transverse horizontal operating shaft having a pair of arms and having a pair of sheaves, a cable associated with said sheaves, a pair of alternatively-operable levers having arms each adapted to cooperate with one of the shaft arms and a lost motion connection between each of the shaft arms and the cooperating lever arm.

BRYAN E. HOUSE.